United States Patent
Kim (10) Patent No.: US 12,290,084 B1
(45) Date of Patent: May 6, 2025

(54) COMPOSITION FOR IMPROVING INTESTINAL BENEFICIAL BACTERIA IN COMPANION ANIMALS

(71) Applicant: Tae Yoon Kim, Yangju-si (KR)

(72) Inventor: Tae Yoon Kim, Yangju-si (KR)

( * ) Notice: Subject to any disclaimer, the term of this patent is extended or adjusted under 35 U.S.C. 154(b) by 0 days.

(21) Appl. No.: 18/932,628

(22) Filed: Oct. 31, 2024

(51) Int. Cl.
| | | |
|---|---|---|
| A23K 10/30 | (2016.01) | |
| A23K 10/18 | (2016.01) | |
| A23K 10/20 | (2016.01) | |
| A23K 20/121 | (2016.01) | |
| A23K 20/142 | (2016.01) | |
| A23K 20/158 | (2016.01) | |
| A23K 20/163 | (2016.01) | |
| A23K 20/189 | (2016.01) | |
| A23K 20/28 | (2016.01) | |

(52) U.S. Cl.
CPC ............. *A23K 10/30* (2016.05); *A23K 10/18* (2016.05); *A23K 10/20* (2016.05); *A23K 20/121* (2016.05); *A23K 20/142* (2016.05); *A23K 20/158* (2016.05); *A23K 20/163* (2016.05); *A23K 20/189* (2016.05); *A23K 20/28* (2016.05)

(58) Field of Classification Search
CPC .................................................... A23K 20/28
See application file for complete search history.

(56) References Cited

U.S. PATENT DOCUMENTS

| | | | |
|---|---|---|---|
| 12,097,281 B1 * | 9/2024 | Kim | A61K 8/368 |
| 2011/0104327 A1 * | 5/2011 | Kirejevas | A23K 50/42 |
| | | | 426/2 |
| 2017/0369434 A1 * | 12/2017 | Mahoney | C07C 323/52 |
| 2022/0395000 A1 * | 12/2022 | Choi | A23K 50/48 |

FOREIGN PATENT DOCUMENTS

| | | |
|---|---|---|
| KR | 10-2463908 B1 | 11/2022 |
| KR | 10-2023-0083178 A | 6/2023 |

OTHER PUBLICATIONS

Ji KR-2168587-B1 Oct. 21, 2020 (Year: 2020).*
Kim KR-2720211-B1 Oct. 18, 2024 (Year: 2024).*

* cited by examiner

*Primary Examiner* — Felicia C Turner
(74) *Attorney, Agent, or Firm* — Paratus Law Group, PLLC (57) ABSTRACT

A composition for improving intestinal beneficial bacteria in companion animals, includes barley sprout extract powder, broccoli sprout extract powder, omega-3 fatty acid, zeolite powder, arginine powder, glutathione powder, chlorella powder, green leaf mussel extract powder, brown rice (unpolished rice) enzyme powder, Kamut enzyme powder, plantago seed (psyllium) husk powder, *Clostridium butyricum* strain Miyairi, N-acetylglucosamine, epigallocatechin-3-gallate and croscarmellose sodium, as active ingredients, and may promote the activation of intestinal beneficial bacteria through edible feeding, thereby contributing to health improvement.

4 Claims, 7 Drawing Sheets

FIG. 1

| Division | Body weight (kg) (body weight after intake) | | | | | |
|---|---|---|---|---|---|---|
| | 1 week | 2 weeks | 3 weeks | 4 weeks | 5 weeks | 6 weeks |
| Control group | 11.2 | 11.24 | 11.2 | 11.3 | 11.28 | 11.47 |
| 1000 mg/kg | 10.66 | 10.75 | 10.72 | 10.72 | 10.70 | 10.80 |
| 3000 mg/kg | 10.87 | 10.85 | 10.87 | 10.84 | 10.85 | 10.93 |

FIG. 2

| Division | Feed intake (g) (feed intake per day) | | | | | |
|---|---|---|---|---|---|---|
| | 1 week | 2 weeks | 3 weeks | 4 weeks | 5 weeks | 6 weeks |
| Control group | 195 | 205 | 202 | 195 | 198 | 204 |
| 1000 mg/kg | 200 | 205 | 202 | 204 | 204 | 202 |
| 3000 mg/kg | 207 | 204 | 211 | 208 | 207 | 203 |

FIG. 3

| Division | Drinking water intake per day (ml) | | | | | |
|---|---|---|---|---|---|---|
| | 1 week | 2 weeks | 3 weeks | 4 weeks | 5 weeks | 6 weeks |
| Control group | 480 | 510 | 505 | 500 | 495 | 515 |
| 1000 mg/kg | 463 | 455 | 445 | 449 | 487 | 452 |
| 3000 mg/kg | 420 | 437 | 442 | 440 | 435 | 438 |

FIG. 4

| Division | Occurrence of problem in skin and respiratory organ | | | | | |
|---|---|---|---|---|---|---|
| | 1 week | 2 weeks | 3 weeks | 4 weeks | 5 weeks | 6 weeks |
| Control group | Normal | Normal | Normal | Normal | Normal | Normal |
| 1000 mg/kg | Normal | Normal | Normal | Normal | Normal | Normal |
| 3000 mg/kg | Normal | Normal | Normal | Normal | Normal | Normal |

FIG. 5

| Division | White blood cell count (0 mg/kg) | |
|---|---|---|
| | 0 week | 6 weeks |
| Control group | 9.6 | 10.5 |
| 1000 mg/kg | 11.3 | 11.1 |
| 3000 mg/kg | 11 | 11.4 |

| Division | Glucose level (0 mg/kg) | |
|---|---|---|
| | 0 week | 6 weeks |
| Control group | 90.5 | 82 |
| 1000 mg/kg | 104 | 98 |
| 3000 mg/kg | 95 | 102 |

| Division | Red blood cell count (0 mg/kg) | |
|---|---|---|
| | 0 week | 6 weeks |
| Control group | 7.2 | 7.1 |
| 1000 mg/kg | 7.4 | 7.3 |
| 3000 mg/kg | 7.3 | 7.3 |

| Division | Blood urea nitrogen level (0 mg/kg) | |
|---|---|---|
| | 0 week | 6 weeks |
| Control group | 26.2 | 21.9 |
| 1000 mg/kg | 20.4 | 23.0 |
| 3000 mg/kg | 22.4 | 24.8 |

| Division | Platelet count (0 mg/kg) | |
|---|---|---|
| | 0 week | 6 weeks |
| Control group | 295 | 327 |
| 1000 mg/kg | 299 | 323 |
| 3000 mg/kg | 305 | 321 |

| Division | Albumin level (0 mg/kg) | |
|---|---|---|
| | 0 week | 6 weeks |
| Control group | 3.7 | 3.7 |
| 1000 mg/kg | 4.0 | 3.6 |
| 3000 mg/kg | 3.8 | 4.0 |

FIG. 6

| Division | Cell viability (%) |
|---|---|
| Control group | 100 |
| 200 µg/mL of composition of the present invention | 96.8 |
| 600 µg/mL of composition of the present invention | 95.4 |

FIG. 7

| Division | Collection of sample | | |
|---|---|---|---|
| | Photograph 1 | Photograph 2 | Photograph |
| Puppy 1 |  |  |  |
| Puppy 2 |  |  |  |
| Puppy 3 |  |  |  |
| Puppy 4 |  |  |  |

FIG. 8

| Division | Collection of sample | | |
|---|---|---|---|
| | Photograph 1 | Photograph 2 | Photograph |
| Cat 1 |  |  |  |
| Cat 2 |  |  |  |
| Cat 3 |  |  |  |
| Cat 4 |  |  |  |

FIG. 9

| Lactobacillus | 0 week | 5 weeks | 10 weeks |
|---|---|---|---|
| Puppy 1 | 24 | 45 | 59 |
| Puppy 2 | 46 | 51 | 62 |
| Puppy 3 | 48 | 55 | 74 |
| Puppy 4 | 55 | 64 | 71 |
| Cat 1 | 42 | 54 | 67 |
| Cat 2 | 38 | 52 | 68 |
| Cat 3 | 53 | 70 | 75 |
| Cat 4 | 54 | 61 | 73 |

| Bifidobacterium | 0 week | 5 weeks | 10 weeks |
|---|---|---|---|
| Puppy 1 | 50 | 59 | 73 |
| Puppy 2 | 52 | 58 | 70 |
| Puppy 3 | 45 | 52 | 60 |
| Puppy 4 | 42 | 61 | 72 |
| Cat 1 | 28 | 41 | 52 |
| Cat 2 | 31 | 48 | 57 |
| Cat 3 | 40 | 52 | 64 |
| Cat 4 | 36 | 55 | 69 |

| Enterococcus faecium | 0 week | 5 weeks | 10 weeks |
|---|---|---|---|
| Puppy 1 | 24 | 45 | 59 |
| Puppy 2 | 46 | 51 | 62 |
| Puppy 3 | 48 | 55 | 74 |
| Puppy 4 | 55 | 64 | 71 |
| Cat 1 | 42 | 54 | 67 |
| Cat 2 | 38 | 52 | 68 |
| Cat 3 | 53 | 70 | 75 |
| Cat 4 | 54 | 61 | 73 |

| Lactococcus | 0 week | 5 weeks | 10 weeks |
|---|---|---|---|
| Puppy 1 | 45 | 52 | 69 |
| Puppy 2 | 52 | 61 | 72 |
| Puppy 3 | 31 | 44 | 68 |
| Puppy 4 | 55 | 70 | 72 |
| Cat 1 | 36 | 41 | 73 |
| Cat 2 | 45 | 61 | 75 |
| Cat 3 | 48 | 57 | 77 |
| Cat 4 | 47 | 53 | 71 |

COMPOSITION FOR IMPROVING INTESTINAL BENEFICIAL BACTERIA IN COMPANION ANIMALS

BACKGROUND

The present invention relates to a composition for improving intestinal beneficial bacteria in companion animals, and more particularly, to an enhanced composition for improving intestinal beneficial bacteria in companion animals, which includes barley sprout extract powder, broccoli sprout extract powder, omega-3 fatty acid, zeolite powder, arginine powder, glutathione powder, chlorella powder, green leaf mussel extract powder, brown rice (unpolished rice) enzyme powder, Kamut enzyme powder, plantago seed (psyllium) husk powder, *Clostridium butyricum* strain Miyairi, N-acetylglucosamine, epigallocatechin-3-gallate and croscarmellose sodium, as active ingredients, and may promote the activation of intestinal beneficial bacteria through edible feeding, thereby contributing to health improvement.

Pets refer to animals that people like, keep close to and protect, and include dogs, cats, birds, goldfish and the like.

Among them, some pets, such as dogs and cats, are expanding their roles as companion animals that live with their owners and share emotional sympathy in a personalized modern society. In recent years, types of the companion animals are diversifying, for example, include parrots, hedgehogs, rabbits and hamsters as well as the dogs and cats, and related industries are also developing rapidly.

For example, food or snacks for companion animals are not simply a means of supplying nutrients, but contain various ingredients to improve the health of the companion animals, as well as products with improved texture or flavor according to preference.

Meanwhile, similar to the human body, it is also known in the companion animals that occurrence of different diseases is closely related to activity of intestinal beneficial bacteria.

For example, the intestinal bacteria are microorganisms distributed on the intestinal epithelium to live in symbiosis, contribute to metabolic functions, and perform interaction with an immune system, protective function against pathogen, etc.

Such intestinal bacteria may be divided into beneficial bacteria and harmful bacteria, wherein the harmful bacteria generate many toxins and bodily wastes harmful to the intestine to collapse intestinal environment, which in turn may cause different diseases.

On the other hand, the intestinal beneficial bacteria facilitate active bowel movement, suppress harmful bacteria, and are helpful for reinforcing immunity.

Among such intestinal beneficial bacteria, representative ones may include, for example, *Lactobacillus, Bifidobacterium, Enterococcus facecium, Lactococcus* or the like.

Therefore, it tends to constantly increase interest for development of technologies relevant to activation of intestinal beneficial bacteria directly relating to health improvement of the companion animals.

In this regard, Korean Patent Registration No. 10-2463908 (Nov. 1, 2022) discloses snacks for companion animals for improving intestinal health and a manufacturing method thereof, with a technique in which any one meat selected from the group consisting of duck meat, chicken meat, whole quail meat, tendon, and ox leg, and any one or two or more selected from oatmeal, sweet potato, carrot, paprika, broccoli, king oyster mushroom and parsley are mixed and pulverized; after mixing the pulverized product, olive oil is added thereto; sweet pumpkin, blueberry or milk is added to the mixture, followed by adding aged liquid and introducing fermentable microorganisms including lactic acid bacteria ('lactobacillus') or others to increase beneficial bacteria.

Further, Korean Patent Laid-Open Publication No. 10-2023-0083178 (Jun. 9, 2023) discloses a composition for improving palatability and intestinal health of companion animals including sunflower lecithin, with a technique in which beet powder obtained after drying the roots of beets with hot air and carrot powder obtained after drying the roots of carrots with hot air are further included to promote the growth of intestinal beneficial bacteria; a technique in which kelp powder obtained after drying kelp with hot air is further included to use an alginic acid ingredient of the kelp to adsorb and discharge wastes in the intestine; a technique in which hydrolyzed yeast extract powder is further included to promote digestion in the intestine; and a technique in which thyme extract powder obtained by extracting thyme with ethanol is further included to adjust a moisture content of feces in the intestine, thereby maintaining the hardness and viscosity of the feces.

PRIOR ART DOCUMENT

Patent Document (Patent Document 1) Korean Patent Registration No. 10-2463908 (Nov. 1, 2022), entitled "snacks for companion animals for improving intestinal health and a manufacturing method thereof"

(Patent Document 2) Korean Patent Laid-Open Publication No. 10-2023-0083178 (Jun. 9, 2023), entitled "a composition for improving palatability and intestinal health of companion animals including sunflower lecithin"

SUMMARY

The present invention was created to review and solve such various problems in the prior art as described above, and a main object of the present invention is to provide an enhanced composition for improving intestinal beneficial bacteria in companion animals, which includes barley sprout extract powder, broccoli sprout extract powder, omega-3 fatty acid, zeolite powder, arginine powder, glutathione powder, chlorella powder, green leaf mussel extract powder, brown rice (unpolished rice) enzyme powder, Kamut enzyme powder, plantago seed (psyllium) husk powder, *Clostridium butyricum* strain Miyairi, N-acetylglucosamine, epigallocatechin-3-gallate and croscarmellose sodium, as active ingredients, and may promote the activation of intestinal beneficial bacteria through edible feeding, thereby contributing to health improvement.

As a means for achieving the above object, the present invention provides a composition for improving intestinal beneficial bacteria of companion animals, which includes: 25 to 35 parts by weight ("wt. parts") of barley sprout extract powder, 25 to 35 wt. parts of broccoli sprout extract powder, 5 to 15 wt. parts of omega-3 fatty acid, 1 to 2 wt. parts of zeolite powder, 5 to 8 wt. parts of arginine powder, 5 to 10 wt. parts of glutathione powder, 5 to 10 wt. parts of chlorella powder, 5 to 10 wt. parts of green leaf mussel extract powder, 30 to 40 wt. parts of brown rice (unpolished rice) enzyme powder, 5 to 10 wt. parts of Kamut enzyme powder, 30 to 40 wt. parts of plantago seed (psyllium) husk powder, 15 to 20 wt. parts of *Clostridium butyricum* strain Miyairi, 5 to 10 wt. parts of N-acetylglucosamine, 10 to 15 wt. parts of epigallocatechin-3-gallate, and 5 to 10 wt. parts of croscarmellose sodium, based on 100 wt. parts of purified water.

According to the present invention, it is possible to obtain enhanced effects through edible feeding of the composition which includes barley sprout extract powder, broccoli sprout extract powder, omega-3 fatty acid, zeolite powder, arginine powder, glutathione powder, chlorella powder, green leaf mussel extract powder, brown rice (unpolished rice) enzyme powder, Kamut enzyme powder, plantago seed (psyllium) husk powder, *Clostridium butyricum* strain Miyairi, N-acetylglucosamine, epigallocatechin-3-gallate and croscarmellose sodium, as active ingredients, and may promote the activation of intestinal beneficial bacteria, thereby contributing to health improvement.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a table showing results of evaluating changes in body weight according to the feeding of tablets of the present invention;

FIG. 2 is a table showing results of evaluating changes in feed intake according to the feeding of tablets of the present invention;

FIG. 3 is a table showing results of evaluating trend for amount of drinking water according to the feeding of tablets of the present invention;

FIG. 4 is a table showing results of evaluating skin and/or respiratory organ problems according to the feeding of tablets of the present invention;

FIG. 5 is a table showing results of hematological analysis according to the feeding of tablets of the present invention;

FIG. 6 is a table showing results of evaluating cell safety according to the feeding of tablets of the present invention;

FIGS. 7 and 8 are exemplary diagrams showing results of a fecal test according to the feeding of tablets of the present invention; and FIG. 9 is a table showing results of changes in intestinal beneficial bacteria according to the feeding of tablets of the present invention.

DETAILED DESCRIPTION

Hereinafter, preferred embodiments of the present invention will be described in detail with reference to the accompanying drawings.

Prior to the description of the present invention, the following specific structural or functional descriptions are only exemplified for the purpose of describing embodiments according to the concept of the present invention, and such embodiments according to the concept of the present invention may be implemented in various forms, and should not be construed as being limited to the embodiments described herein.

The composition for improving intestinal beneficial bacteria in companion animals according to the present invention includes barley sprout extract powder, broccoli sprout extract powder, omega-3 fatty acid, zeolite powder, arginine powder, glutathione powder, chlorella powder, green leaf mussel extract powder, brown rice (unpolished rice) enzyme powder, Kamut enzyme powder, plantago seed (psyllium) husk powder, *Clostridium butyricum* strain Miyairi, N-acetylglucosamine, epigallocatechin-3-gallate and croscarmellose sodium, as active ingredients.

Therefore, these compositions may be dissolved in purified water and produced in the form of tablets, which in turn may be fed to a companion animal, in particular, a puppy.

More particularly, the composition of the present invention includes 25 to 35 wt. parts of barley sprout extract powder, 25 to 35 wt. parts of broccoli sprout extract powder, 5 to 15 wt. parts of omega-3 fatty acid, 1 to 2 wt. parts of zeolite powder, 5 to 8 wt. parts of arginine powder, 5 to 10 wt. parts of glutathione powder, 5 to 10 wt. parts of chlorella powder, 5 to 10 wt. parts of green leaf mussel extract powder, 30 to 40 wt. parts of brown rice (unpolished rice) enzyme powder, 5 to 10 wt. parts of Kamut enzyme powder, 30 to 40 wt. parts of plantago seed (psyllium) husk powder, 15 to 20 wt. parts of *Clostridium butyricum* strain Miyairi, 5 to 10 wt. parts of N-acetylglucosamine, 10 to 15 wt. parts of epigallocatechin-3-gallate, and 5 to 10 wt. parts of croscarmellose sodium, based on 100 wt. parts of purified water.

At this time, the barley sprout extract powder contains large amounts of beta-carotene, flavonol glycoside rutin, selenium, crystalline polypeptide glutathione and quercetin, which are antioxidants, thereby contributing to improvement of intestinal health.

Further, the broccoli sprout extract powder contains a large amount of sulforaphane component, thereby contributing to adjustment of blood glucose and enhancement of intestinal health.

Further, the omega-3 fatty acid is a type of unsaturated fatty acids and an essential fatty acid necessarily required for the human body, however, cannot be synthesized in vivo thus should be replenished in the form of food or supplements.

It has been reported that such omega-3 fatty acid serves to the reduction of blood triglyceride, improved inflammation and mitigation of ulcerative colitis, and effectively proliferates intestinal beneficial bacteria.

Further, the zeolite powder serves to purification or antioxidation by far-infrared radiation.

In addition, the arginine powder is one of twenty (20) types of amino acids to form a protein, and mostly contained in large content in herrings and salmons.

Such arginine may enhance blood flow, reduce inflammation, and in particular, contribute to intestinal health of companion animals.

In addition, the glutathione powder may serve to cell proliferation, immune reaction and inhibition of oxidation stress due to antioxidation. Most of all, it is known to exhibit effects in enhancement of immunity through activation of intestinal beneficial bacteria.

Further, the chlorella powder is a powdered product of a type of planktons, is rich in vitamins and minerals, and in particular, contains carotenoid as an antioxidant such that it is helpful for not only enhancing immunity but also improving intestinal health of companion animals.

Furthermore, the green leaf mussel extract powder contains large amounts of omega-3 fatty acid, fatty acid chondroitin and sulfate, therefore, may serve to implement antioxidation effects, inflammation inhibition, activation of intestinal beneficial bacteria in companion animals, thereby contributing to enhancement of immunity.

Furthermore, the brown rice (unpolished rice) enzyme powder is rich in dietary fibers to facilitate improvement of intestinal health, and also serves to promote digestion and activation of intestinal microorganisms.

Particularly, the phytic acid contained therein suppresses active oxygen and serves to increase antioxidation.

Further, the Kamut enzyme powder has strong antioxidation due to selenium and thus excellent anticancer effects, and is effective in improving and treating inflammation, such that intestinal microorganism environments become favorable, thereby contributing to increase in beneficial bacteria for improving immunity.

Furthermore, the plantago seed (psyllium) husk powder is obtained by pulverizing the husk of plantain seeds, which can promote absorption of moisture in the bowel to improve constipation, reduce cholesterol, inhibit active oxygen, and serve to activation of intestinal microorganisms.

Here, the *Clostridium butyricum* strain Miyairi is a substance to increase the cultivability of butyric acid bacteria, and contributes to suppressing the proliferation of intestinal pathogenic bacteria by increasing the activity of butyric acid bacteria.

In addition, the N-acetylglucosamine is obtained by hydrolyzing chitin which is a component forming the shell of crustaceans such as a shrimp or crabs, etc., and serves to suppress aging by reducing the enzyme activity for collagen decomposition and elastin decomposition, and above all, enhance the defensive function against bacterial penetration.

In addition, the epigallocatechin-3-gallate is a substance corresponds to CAS No. 84650-60-2, has a molecular formula of $C_{22}H_{18}O_{11}$, and serves to suppress rancidity and promote digestion.

Furthermore, the croscarmellose sodium is a substance corresponds to CAS No. 74811-65-7, which is a cross-linked polymer of sodium carboxymethyl cellulose, and improves the disintegration of tablets.

In addition, in the present invention, 15 wt. parts of biotin powder may be further added based on 100 wt. parts of the purified water.

In this case, the biotin powder is obtained by pulverizing sulfur-containing water soluble vitamins, which is degraded during fermentation and participates in lipid synthesis, protein and/or hydrocarbonate metabolism, thereby contributing to enhancement of intestinal health of companion animals.

In addition, in the present invention, 10 wt. parts of sodium carboxymethyl cellulose may be further added based on 100 wt. parts of the purified water.

At this time, the sodium carboxymethyl cellulose is water-soluble cellulose and thus serves to improve liver diseases through fibers.

In addition, in the present invention, 10 wt. parts of trehalose may be further added based on 100 wt. parts of the purified water.

In this case, the trehalose is a disaccharide composed of two glucose molecules, which is used in a liquid state dissolved in water, and serves to enhance sweetness and stabilize pH.

Hereinafter, examples will be described.

Example 1

First, the composition for improving intestinal beneficial bacteria of companion animals according to the present invention was prepared as follows, and then soaked in purified water to form a formulation in a tablet form so that it could be fed to companion animals, especially puppies.

That is, based on 100 wt. parts of purified water, 30 wt. parts of barley sprout extract powder, 30 wt. parts of broccoli sprout extract powder, 8.5 wt. parts of omega-3 fatty acid, 1.5 wt. parts of zeolite powder, 5.5 wt. parts of arginine powder, 6.5 wt. parts of glutathione powder, 6.5 wt. parts of chlorella powder, 8.5 wt. parts of green leaf mussel extract powder, 35 wt. parts of brown rice (unpolished rice) enzyme powder, 7.5 wt. parts of Kamut enzyme powder, 35 wt. parts of plantago seed (psyllium) husk powder, 16.5 wt. parts of *Clostridium butyricum* strain Miyairi, 7.5 wt. parts of N-acetylglucosamine, 12 wt. parts of epigallocatechin-3-gallate, and 8 wt. parts of croscarmellose sodium were mixed together to form a formulation in a tablet form.

Example 2

The same procedure as in Example 1 was conducted, except that 15 wt. parts of biotin powder was further added based on 100 wt. parts of the purified water.

Example 3

The same procedure as in Example 1 was conducted, except that 10 wt. parts of sodium carboxymethyl cellulose was further added based on 100 wt. parts of the purified water.

Example 4

The same procedure as in Example 1 was conducted, except that 10 wt. parts of trehalose was further added based on 100 wt. parts of the purified water.

Then, the oral administration safety of the tablets of [Examples 1-4] prepared as described above was assessed.

The oral administration safety assessment was performed by evaluating the average change in body weight, feed intake, water intake, and whether or not skin and respiratory problems occur for the four examples while feeding the composition of the present invention (Examples 1-4). The composition was processed in the form of tablets, and experiments were conducted for 6 weeks with feeding once a day. The experimental subjects were divided into a control group, a clinical dose group, and a clinical dose 3-fold group for 6 adult 5-year-old pet dog beagles, and tested for changes in the body weight while feeding the tablets of Examples 1-4, respectively. The same living environment conditions were set, and experiment results are shown in the drawings.

[Evaluation of Changes in Body Weight]

As shown in FIG. 1, in the case of the control group fed with the composition of the present invention, the initial body weight was observed as 11.2 kg while having 11.47 kg at the end of the experiment. On the other hand, for the clinical dose group (1000 mg/kg), it was confirmed to have 10.66 kg at the beginning and 10.80 kg at the end of the experiment, and for the clinical dose 3-fold group (3000 mg/kg), it was confirmed to have 10.87 kg at the beginning and 10.93 kg at the end of the experiment.

That is, rapid change in body weight or abnormal symptoms according to the feeding of the composition of the present invention were not found in all of the control group, clinical dose group, and clinical dose 3-fold group, therefore, the composition of the present invention was determined to be safe.

[Evaluation of Feed Intake]

As shown in FIG. 2, in the case of feed intake, the control group was observed to have 195 g at the beginning and 204 g at the end of the experiment, and the clinical dose group was observed to have 200 g at the beginning and 202 g at the end of the experiment. Further, it was confirmed that the clinical 3-fold dose group has the initial intake of 207 g and 203 g at the end of the experiment. Therefore, it was determined that the feed intake of the clinical 3-fold dose group was not significantly reduced compared to the control group.

That is, rapid change in feed intake or abnormal symptoms according to the feeding of the composition of the present invention were not found in all of the control group, clinical dose group, and clinical 3-fold dose group.

[Evaluation of Trend for Amount of Drinking Water]

Figure 1:
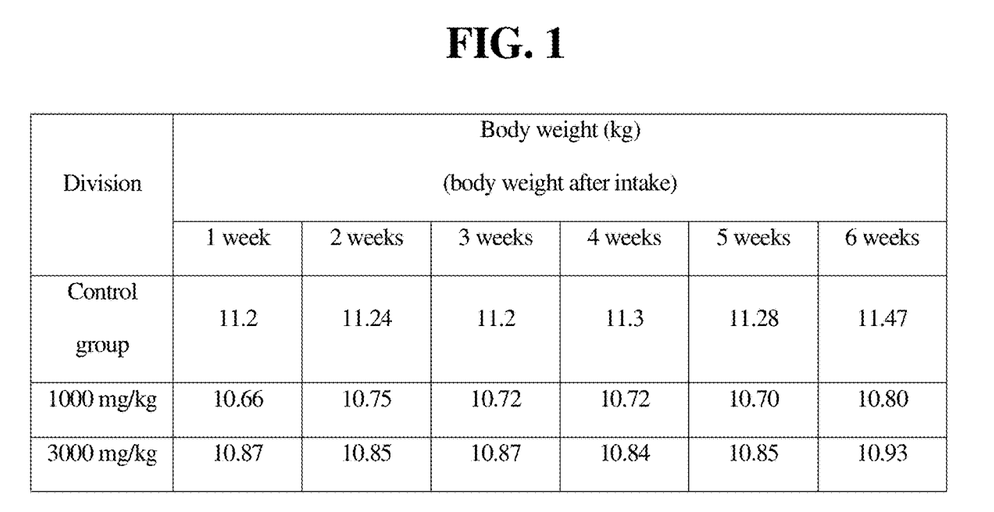
Figure 2:
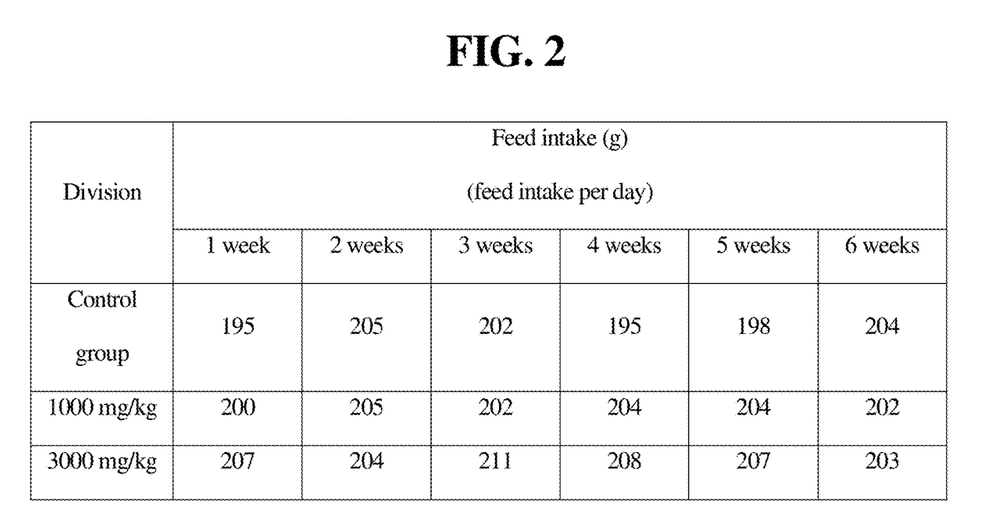
Figure 3:
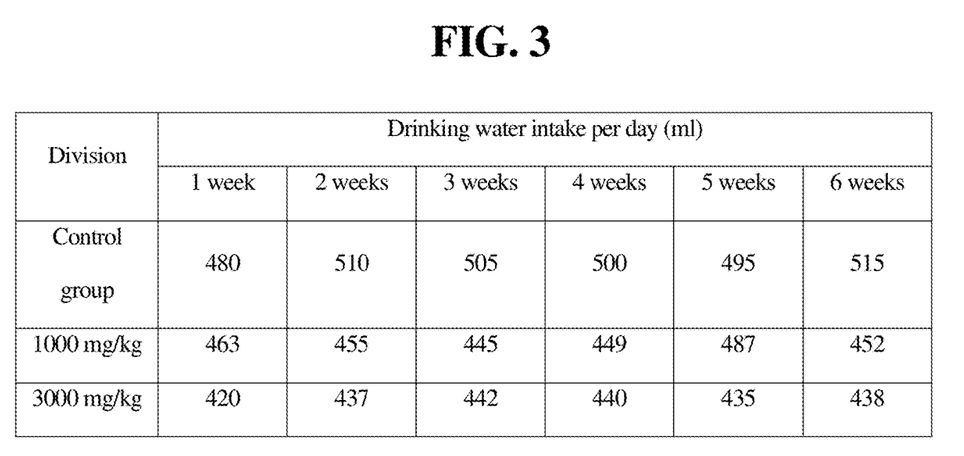

As shown in FIG. 3, in the case of the amount of drinking water, the control group was observed to have 480 ml at the beginning and 515 ml at the end of the experiment, the clinical dose group was observed to have 463 ml at the beginning and 452 ml at the end of the experiment, and the clinical 3-fold dose group was determined to have 420 ml at the beginning and 438 ml at the end of the experiment.

Therefore, it could be confirmed that the amount of drinking water also did not shown a significant change compared to the control group. In addition, skin, respiratory, behavior, etc. were evaluated for abnormal symptoms, but no significant abnormal symptoms were found.

[Evaluation of Problems in Skin and Respiratory Organ]

Figure 4:
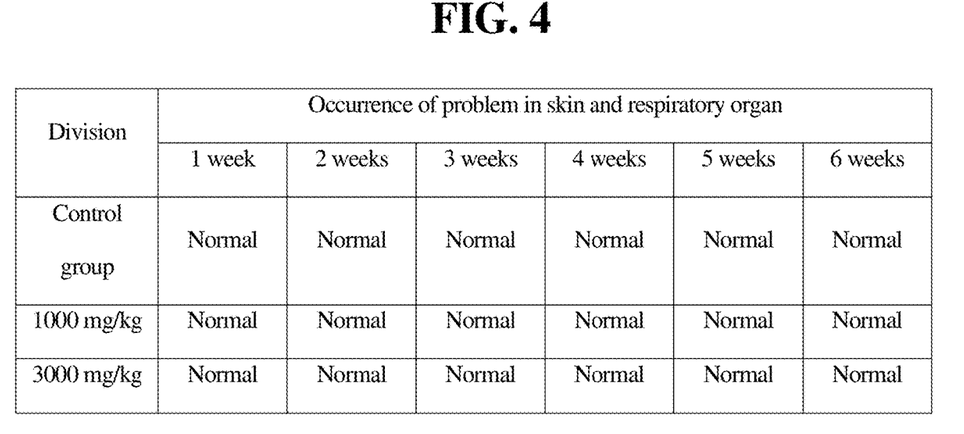

As shown in FIG. 4, no rapid decrease or increase in body weight caused by oral administration of the composition of the present invention was observed, or abnormal changes in food intake, and abnormal changes in amount of drinking water were not found. Further, skin rash, dyspnoea, pathogenesis, and abnormal behavior due to stress were not observed.

Figure 5:
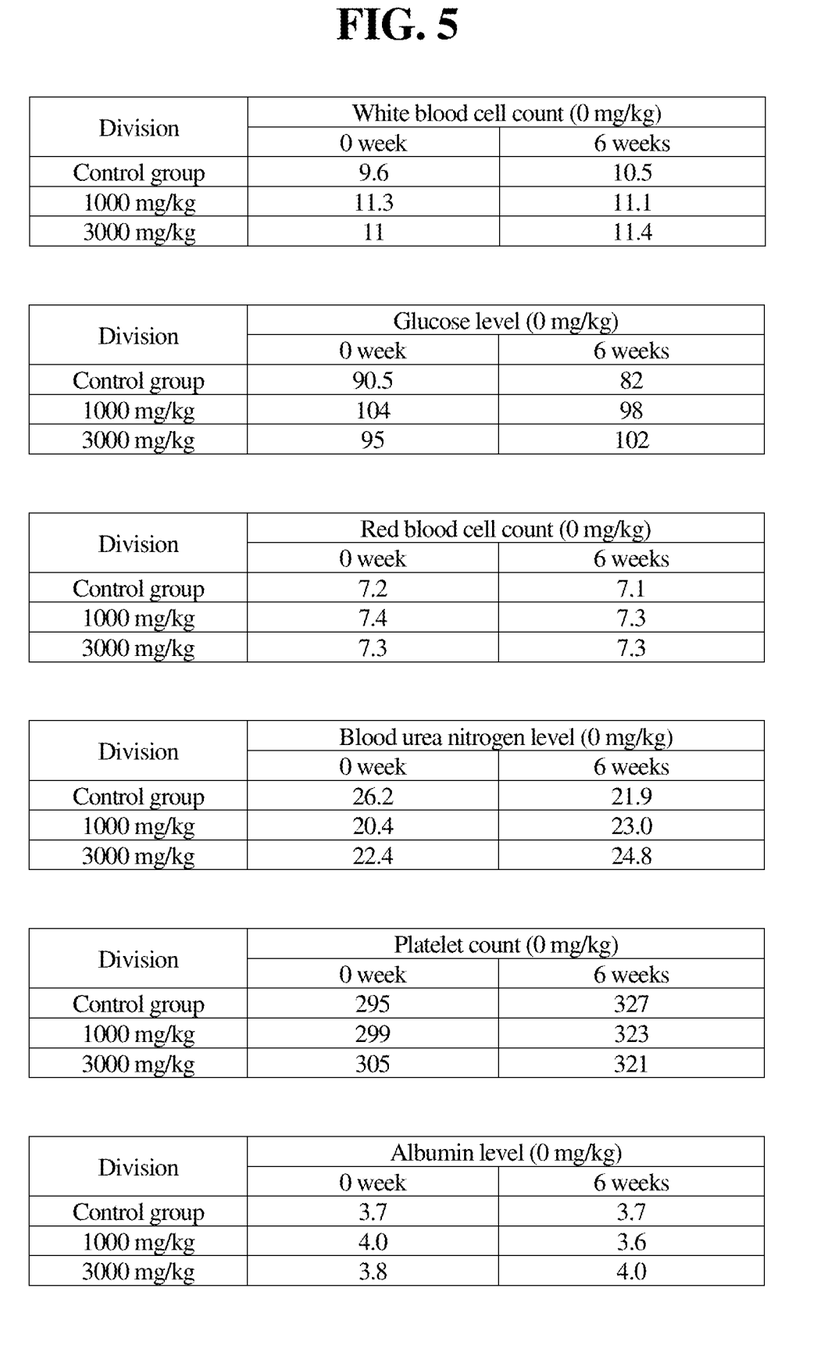

Further, the safety of oral administration was evaluated by analyzing hematology parameters such as white blood cell (WBC), red blood cell (RBC), and platelet (PLT) counts, and blood chemistry parameters such as glucose (GLC), blood urea nitrogen (BUN), and albumin (ALB) levels. Results thereof are shown in FIG. 5. Further, the change is expressed as an average value while feeding Examples 1-4 for each pet dog.

Meanwhile, as shown in FIG. 5, as a result of observing changes in white blood cell count, red blood cell count, platelet count, etc. through hematological analysis, all of the values were determined to be within the normal range and no significant abnormal results were observed. Although the glucose levels, blood urea nitrogen levels, and albumin levels were tested to assess liver, kidney and internal organ abnormalities through blood chemistry analysis, no enzyme changes were observed in the kidneys, hepatobiliary system, and internal organs. Therefore, it was determined that there is no problem with oral administration of the composition of the present invention.

[Evaluation of Cell Safety]

In order to assess the safety, cell viability was measured, which was conducted by applying the method of Carmichael et al. Specifically, the incubated cells were dispensed by $2 \times 10^2$/well in a 96-well plate, and after 24 hours, the composition of the present invention was diluted in PBS or 50% DMSO as a solvent at 200 and 600 μg/mL, followed by culturing for 24 hours. Thereafter, 200 μL of 1 mg/mL MTT solution was added thereto, followed by culturing for 3 hours, and then the supernatant was removed.

Figure 6:
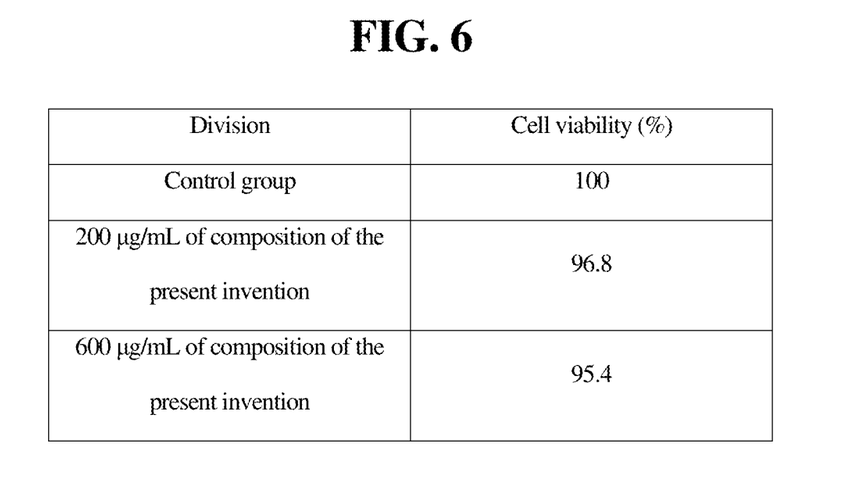

Thereafter, 200 μL DMSO was added thereto, followed by agitation in a dark room for 30 minutes. Then, absorbance was measured at 540 nM wavelength by a microplate reader (BioTek Winiiski, USA) in order to estimate the cell viability, i.e., cell survival rate. Results thereof are shown in FIG. 6.

The cell viability was converted relative to 100% of the control group without drug treatment (CON). When the cell viability is 80% or less, it was determined as a concentration with toxicity.

The composition of the present invention showed the cell viability of 95% or more. Based on these results, the composition of the present invention was determined to have no cytotoxicity, which in turn could be analyzed to ensure safety.

Meanwhile, in order to confirm whether to increase intestinal beneficial bacteria or not by feeding the companion animal (e.g., puppy and cat) with the composition according to the present invention, a test (RT PCR MASS ARRAY on feces) was conducted.

Figure 7:
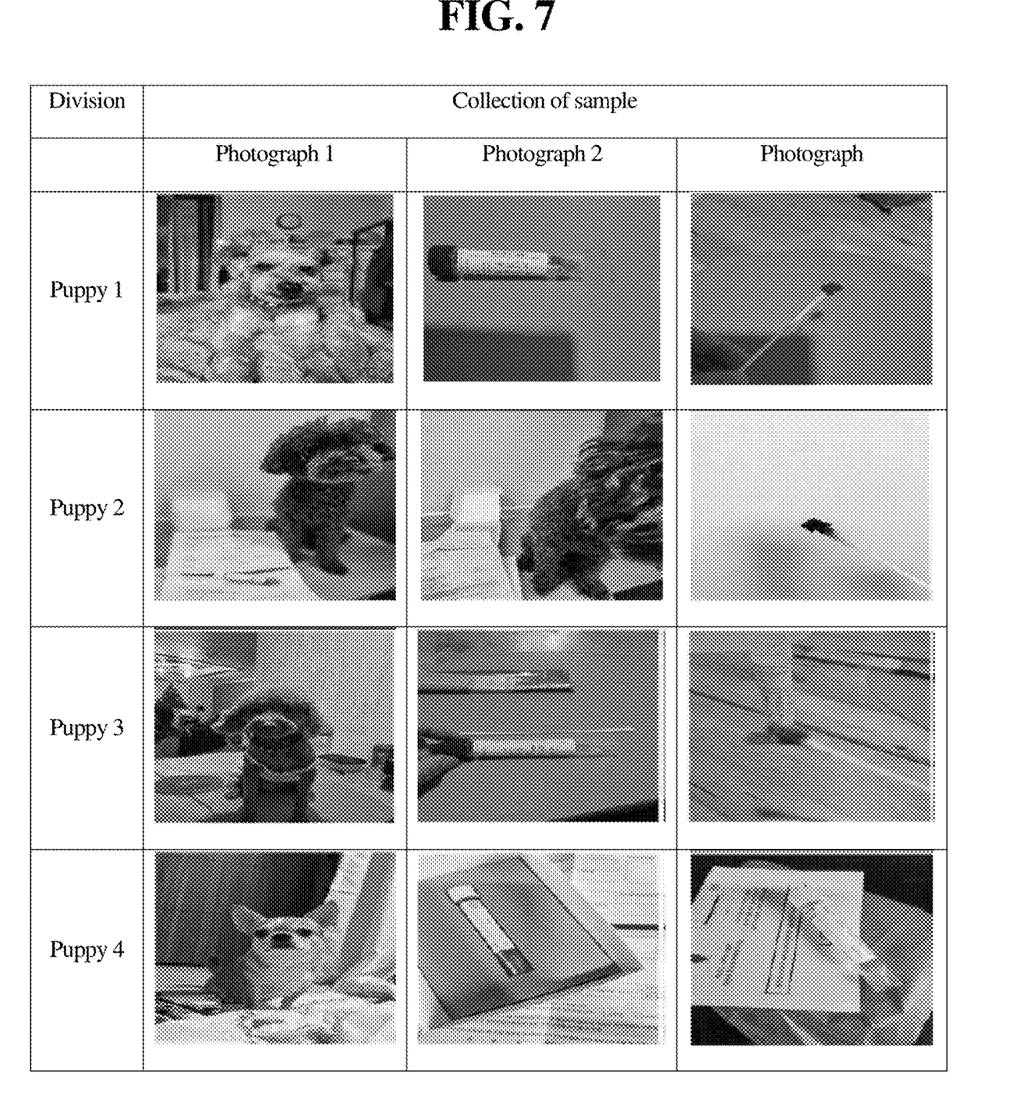
Figure 8:
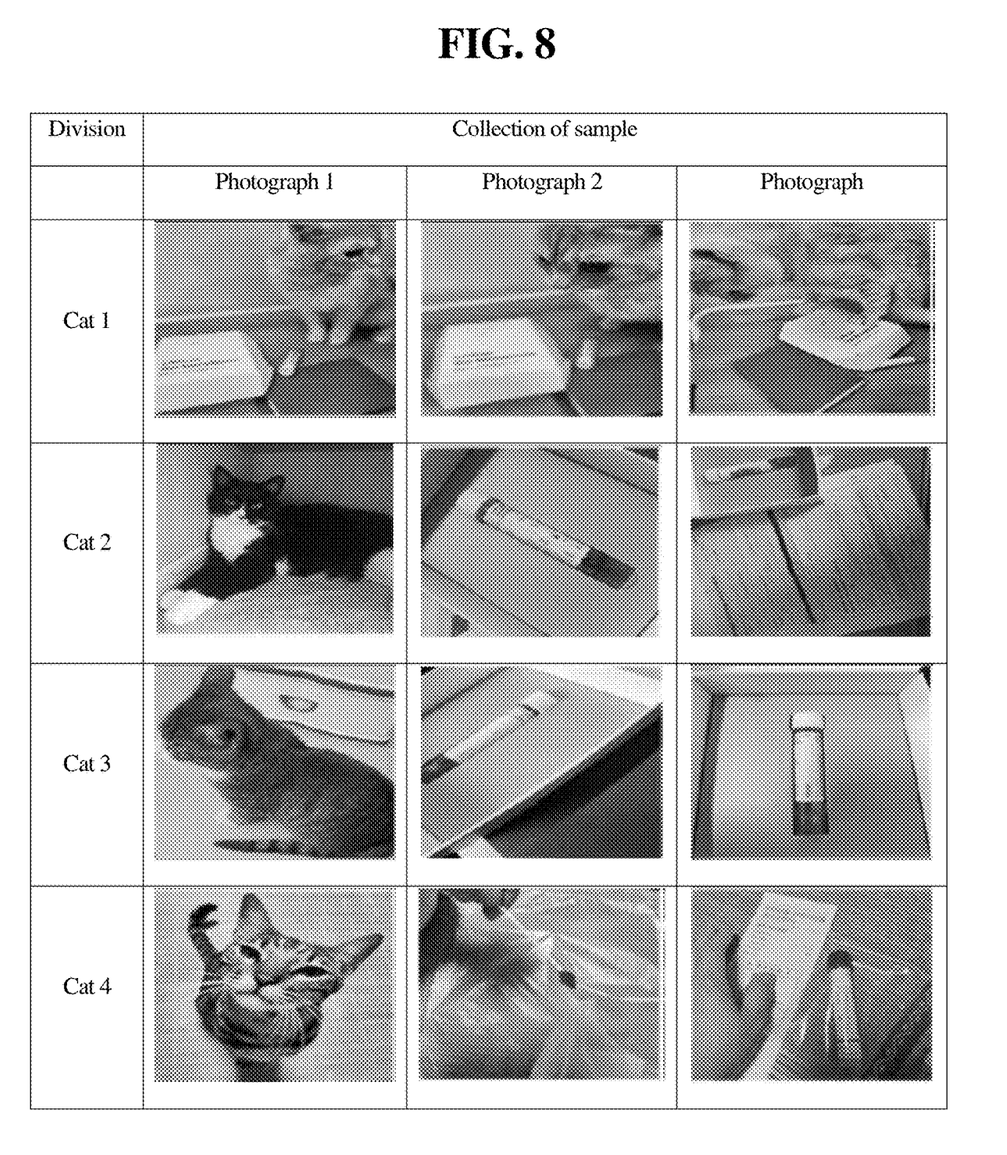

Four puppies and four cats were selected as companion animals to be tested, and the related photographs and sample collection processes are shown in FIGS. 7 and 8.

For evaluation, microcrystalline cellulose and the composition of the present invention were mixed at a weight ratio of 1:1 to be suitable for oral administration and easy to ingest, then the mixture was processed in the form of tablets (1000 mg/kg of body weight). Thereafter, the companion animals were fed with the tablets once a day for 10 weeks, followed by conducting the experiment.

At this time, (1) Puppy 1 (14-year-old Schnauzer), Puppy 2 (6-year-old Poodle), Puppy 3 (5-year-old Poodle) and Puppy 4 (4-year-old Chihuahua); and (2) Cat 1 (2-year-old American Shorthair), Cat 2 (4-year-old Korean Shorthair Tuxedo), Cat 3 (3-year-old Korean Shorthair) and Cat 4 (4-year-old Bengal) were selected for experiment, and changes in intestinal beneficial bacteria thereof were observed.

Further, in order to determine whether immunity is improved, an intestinal beneficial bacteria test was conducted with the main purpose of determining whether to increase a ratio of beneficial intestinal bacteria helpful for immunity or not.

The test was performed using MassArray Dx Analyzer 4 (medical equipment registration No.: KFDA 17-2029) and Complete iPLEX Reagent Set developed by Agena Bioscience (San Diego, CA, USA), and the item to be tested was immune-related intestinal beneficial bacteria. The evaluation was performed by scoring the strain ratio.

At this time, the evaluation was conducted in a way of detecting quantitative changes in *Lactobacillus, Bifidobacterium, Enterococcus faecium*, and *Lactococcus*, which are representative intestinal beneficial bacteria.

Figure 9:
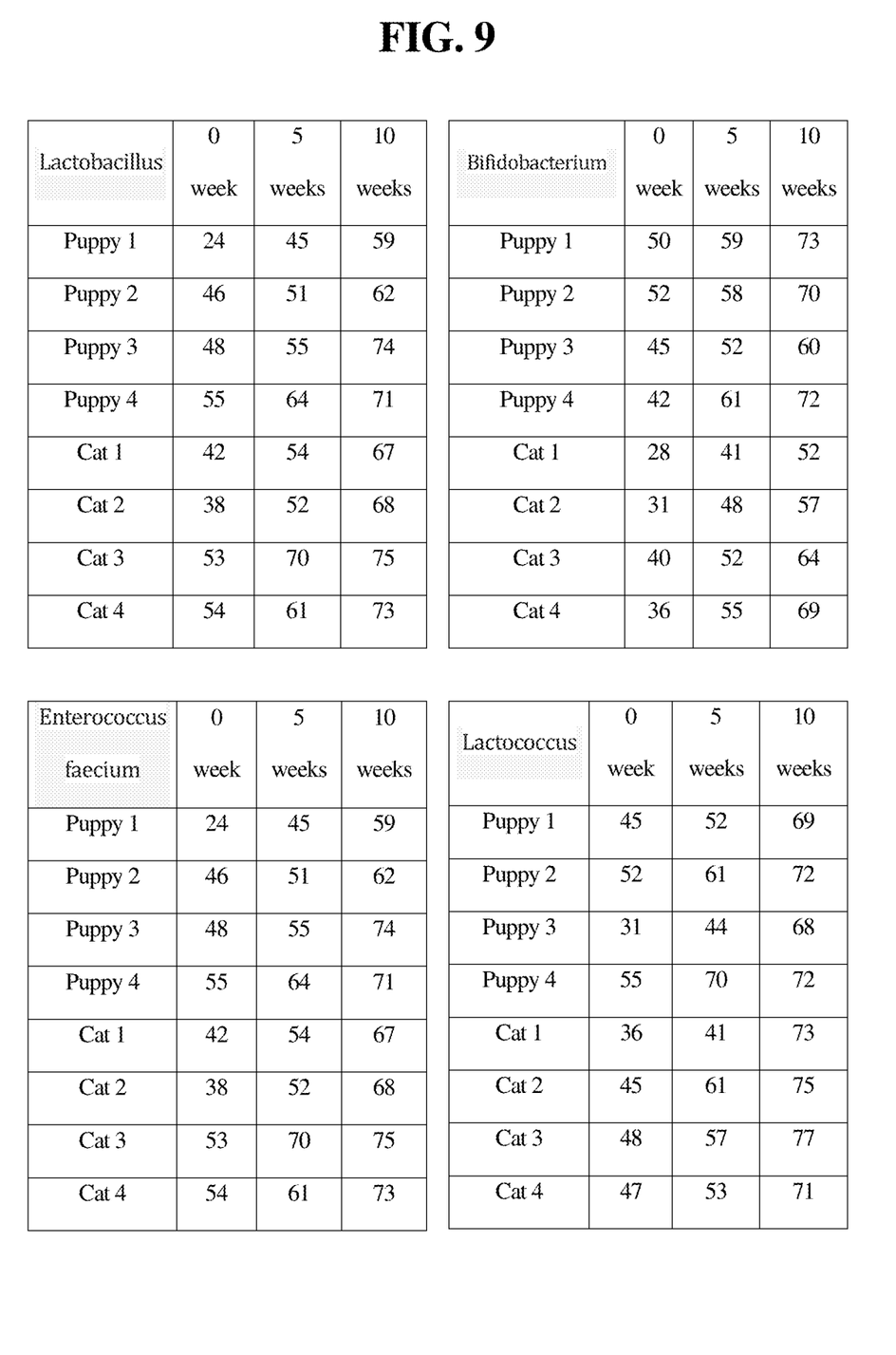

In addition, changes thereof according to the feeding of the composition of the present invention are shown in FIG. 9.

As a result of feeding the composition according to the present invention for 10 weeks, it could be confirmed that the proportion of the beneficial intestinal bacteria such as *Lactobacillus, Bifidobacterium, Enterococcus faecium*, and *Lactococcus* was significantly increased.

These results correspond to the experimental puppies and cats in common, and no separate abnormal reaction was observed, such that it could be determined as an increase in the intestinal beneficial bacteria of normal companion animals.

What is claimed is:

1. A composition for improving intestinal beneficial bacteria in companion animals, the composition comprising: 25 to 35 parts wt. parts of barley sprout extract powder, 25 to 35 wt. parts of broccoli sprout extract powder, 5 to 15 wt. parts of omega-3 fatty acid, 1 to 2 wt. parts of zeolite powder, 5 to 8 wt. parts of arginine powder, 5 to 10 wt. parts of glutathione powder, 5 to 10 wt. parts of chlorella powder, 5 to 10 wt. parts of green leaf mussel extract powder, 30 to 40 wt. parts of unpolished rice enzyme powder, 5 to 10 wt. parts of Kamut enzyme powder, 30 to 40 wt. parts of psyllium husk powder, 15 to 20 wt. parts of *Clostridium butyricum* strain, 5 to 10 wt. parts of N-acetylglucosamine, 10 to 15 wt. parts of epigallocatechin-3-gallate, and 5 to 10 wt. parts of croscarmellose sodium, based on 100 wt. parts of purified water.

2. The composition according to claim 1, wherein 15 wt. parts of biotin powder is further added based on 100 wt. parts of the purified water.

3. The composition according to claim 1, wherein 10 wt. parts of sodium carboxymethyl cellulose is further added based on 100 wt. parts of the purified water.

4. The composition according to claim 1, wherein 10 wt. parts of trehalose is further added based on 100 wt. parts of the purified water.

* * * * *